United States Patent
Lenicky et al.

(10) Patent No.: US 12,098,816 B2
(45) Date of Patent: Sep. 24, 2024

(54) ILLUMINATION DEVICE FOR VEHICLE

(71) Applicant: ZKW Group GmbH, Wieselburg (AT)

(72) Inventors: Viktor Lenicky, Matuskovo (SK); Mario Zubaj, Nadlice (SK); Csaba Bedec, Galanta (SK)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/535,033

(22) Filed: Dec. 11, 2023

(65) Prior Publication Data
US 2024/0200746 A1    Jun. 20, 2024

(30) Foreign Application Priority Data
Dec. 15, 2022  (EP) .................................. 22213945

(51) Int. Cl.
*F21S 41/50*   (2018.01)
*F21S 43/50*   (2018.01)

(52) U.S. Cl.
CPC .............. *F21S 41/50* (2018.01); *F21S 43/50* (2018.01)

(58) Field of Classification Search
CPC .. F21S 41/50; F21S 41/55; F21S 43/50; F21S 43/51; B60Q 1/325
See application file for complete search history.

(56) References Cited

U.S. PATENT DOCUMENTS

| | | |
|---|---|---|
| 2005/0213351 A1 | 9/2005 | Yang |
| 2009/0237939 A1 | 9/2009 | Sakamoto |
| 2015/0356895 A1 | 12/2015 | Boppart et al. |
| 2019/0337448 A1 | 11/2019 | Birman et al. |
| 2019/0359123 A1 | 11/2019 | Dellock et al. |
| 2022/0120400 A1 | 4/2022 | Bailey |

FOREIGN PATENT DOCUMENTS

| | | | |
|---|---|---|---|
| JP | H0930325 A | | 2/1997 |
| JP | 2014004956 A | | 1/2014 |
| JP | 2015008056 A | | 1/2015 |
| JP | 2015069862 A | * | 4/2015 |

OTHER PUBLICATIONS

Extended European Search Report Issued in European Patent No. 22213945.3 dated Jun. 5, 2023 (13 Pages).

* cited by examiner

*Primary Examiner* — Sean P Gramling
(74) *Attorney, Agent, or Firm* — Eversheds Sutherland (US) LLP

(57) ABSTRACT

An illumination device (1) for a vehicle, wherein the illumination device (1) is configured to create an illuminated, in particular 3-dimensional, shape. The illumination device includes an optical element (2), a first bezel element (3), a second bezel element (4), a light source (5) and a diffuser device (6), wherein the optical element, the first bezel element, and the second bezel element are arranged downstream of the diffuser device. The illuminated shape created with the illumination device is composed of an illuminated and a dark area, wherein the illuminated area is created by the light emitting surface of the illuminated optical element and the dark area is created by the first bezel element and the second bezel element blocking/absorbing light, wherein the first bezel element comprises an aperture, wherein the optical element and the second bezel element permeate the aperture.

20 Claims, 2 Drawing Sheets

ILLUMINATION DEVICE FOR VEHICLE

CROSS-REFERENCE TO RELATED APPLICATIONS

This application claims priority to European Patent Application No. 22213945.3, filed Dec. 15, 2022, which is incorporated herein by reference.

FIELD OF THE INVENTION AND DESCRIPTION OF PRIOR ART

The invention relates to an illumination device for a vehicle, wherein said illumination device is configured to create an illuminated, in particular 3-dimensional, shape, wherein the illumination device comprises an optical element, a first bezel element and a second bezel element, wherein the illuminated shape is created by an optical interaction between the optical element, the first bezel element and the second bezel element, wherein the illumination device further comprises a light source, configured to emit light along a main direction, a diffuser device arranged downstream of the light source along the main direction, configured to receive light from the light source via a light entry surface of the diffuser device and to emit the received light via a light exit surface of the diffuser device, wherein the diffuser device is configured to scatter and/or diffuse light received from the light source along the main direction and to illuminate the optical element with the scattered/diffused light, wherein the illuminated optical element receives the scattered/diffused light from the diffuser device via a light receiving surface of the optical element and emits the received light along the main direction via a light emitting surface of the optical element, said light emitting surface has a longitudinal extension along the main direction.

The invention further relates to a vehicle body part, comprising an illumination device.

In the prior art, illumination devices for creating illuminated, in particular 3-dimensional (3D), shapes are known. In particular, in the automotive industry, 3-dimensional logos are usually created via thick-wall optics, which have an elongated shape (compared to e.g. a standard lens) in order to achieve a 3D illuminated shape. Those thick-wall optics are usually illuminated from a backside thereof and light is emitted via a frontside thereof. Due to the elongation of the thick-wall optics, the contrast of the illuminated shape as well as the homogeneity of emitted light therefrom is not ideal.

As a result, homogenous illumination and simultaneously a clear and sharp contrast between light emitting and non-light emitting parts of the illumination device, which together form a particular shape, has not been achieved in the prior art.

SUMMARY OF THE INVENTION

It is an object of the invention to provide an illumination device, with which the creation of illuminated shapes, in particular 3D shapes, is improved.

To achieve this object an illumination device according to claim 1 is provided. Preferred embodiments of the invention are described in depended claims.

According to a first aspect of the invention, the optical element, the first bezel element and the second bezel element are arranged downstream of the diffuser device along the main direction, wherein the illuminated shape created with the illumination device is composed of an illuminated, light emitting, area and a dark, non-light emitting, area, wherein the illuminated area is created by the light emitting surface of the illuminated optical element and the dark area is created by the first bezel element blocking/absorbing light emitted by the diffuser device and the second bezel element blocking/absorbing light emitted by the diffuser device respectively, wherein the first bezel element comprises an aperture, which has a shape defined and limited by a rim portion of the first bezel element and which lies in an aperture plane, wherein the first bezel element and the optical element are arranged to each other in such a way, that the optical element permeates said aperture in a sectional plane, which coincides within the aperture plane, such that the light receiving surface of the optical element is arranged on a diffuser device facing side of the first bezel element and the light emitting surface of the optical element is arranged at least partially on a diffuser device averted side of the first bezel element, wherein the second bezel element has a longitudinal extension along the main direction, wherein the first bezel element and the second bezel element are arranged to each other in such a way, that second bezel element permeates the aperture in the sectional plane.

This has the advantage, that the shading (or light blocking) of the first bezel element and the second bezel element create a sharp contrast compared to the illuminated optical element, and simultaneously, the optical element emits light homogenously over its entire light emitting surface (in this disclosure, "homogenous" means that the intensity or flux of light emitted by the optical element is essentially constant over the entire light emitting surface. Such a homogenous light emission creates a very even (or uniform) illumination for an observer of the illumination device, which can improve the readability or recognisability of the illuminated shape). Consequently, a 3D logo (such as a sign, letter, etc.) can be created by a collaboration of the illuminated (and light emitting) optical element and the first bezel element and the second bezel element. Due to the fact that the optical element and the second bezel element both permeate the aperture of the first bezel element, a compact design can be achieved. Furthermore, due to the longitudinal extension (or longitudinal shape) of the second bezel element, light can be blocked from traversing from a first portion of the light emitting surface of the optical element to a second portion of the light emitting surface of the optical element, wherein said first portion and said second portion could be e.g. arranged vertically above each other. For example, the optical element could be shaped like a 3D letter, wherein the second bezel element could be shaped like a non-illuminated interior portion of said letter (e.g. the inner portion of the letter "A"), in order to shade/darken inner parts of said letter, and the first bezel element could be shaped like a surrounding of said 3D letter (e.g. the outer shape of the letter "A"), therefore encompassing the optical element in order to shade/darken the side surface or outer parts of said letter. The diffuser device is a device configured to receive light and emit the received light as diffused light. A diffuser device (also called a light diffuser or optical diffuser) is any device or material that diffuses (or scatters) light in some manner to transmit so called soft light. Soft light (or diffused light) can e.g. be obtained by reflecting light from a white surface, while other diffusers may use translucent materials, including ground glass, milk glass, and greyed glass, or use electro-optic devices. Preferably, the aperture plane is surrounded (or limited) by the rim portion of the aperture. In other words, the aperture plane is a fictional plane which can be described by an opening, said opening is defined by the 2-dimensional plane which defines the aperture itself. In a state of operation of the illumination device, the optical element and the second bezel element are preferably arranged relative to the first bezel element in a mounting position, in which the relative positions of the optical element and the second bezel element to the first bezel element are fixed. In particular, in the mounting position, the optical element and the second bezel element at partially protrude through the aperture. Preferably, the second bezel element is a light blocking element, e.g. a shade element, configured to block impinging light.

Advantageously, on the diffuser device averted side of the first bezel element the longitudinal extension of the second bezel element is shorter than the longitudinal extension of the optical element. In other words, starting from the sectional plane, the second bezel element is shorter than the optical element along the main direction. This has the advantage of improving the 3D effect created with the illumination device.

Advantageously, in the sectional plane, defined as the plane in which the optical element and the second bezel element intersect the aperture plane, the intersection of the optical element with the aperture plane defines a first shape, the intersection of the second bezel element with the aperture plane defines a second shape, and the rim portion of the first bezel element defines a third shape within the aperture plane, wherein the first shape, the second shape and the third shape together depict a 2-dimensional projection of the illuminated shape.

Advantageously, the optical element has an outer surface, which corresponds to the illuminated, light emitting, area of the illuminated shape, wherein the second bezel element has an outer surface, which corresponds to a first portion of the dark, non-light emitting, area of the illuminated shape, wherein the rim portion of the first bezel element corresponds to a second portion of the dark, non-light emitting, area of the illuminated shape, wherein the first portion and the second portion form the dark, non-light-emitting, area of the illuminated shape.

Preferably, the first bezel element corresponds to an outer portion of the dark, non-light-emitting, area of the illuminated shape and the second bezel element corresponds to an inner portion of the dark, non-light-emitting, area of the illuminated shape.

Advantageously, an intersection of an outer surface of the optical element in the sectional plane, corresponds to the shape of the aperture in such a way, that when the optical element permeates the aperture, the outer surface of the optical element at least partially or fully contacts the rim portion. Due to the contact, the contrast of the illuminated shape can be improved.

Advantageously, the shape of the optical element and the shape of the aperture are formed dependent on each other in such a way, that movement of the optical element relative to the first bezel element, in a state when the optical element is inserted in the aperture, is limited to a direction along the main direction. Preferably, insertion of the optical element and/or the second bezel element in the aperture of the first optical element is done alone the main direction.

Advantageously, the optical element is an optical transparent body with a longitudinal extension along the main direction, wherein the second bezel element comprises an optical non-transparent body with a longitudinal extension along the main direction. Preferably, the optical transparent body is a full body, e.g. comprising a transparent polymer.

Advantageously, a diffuser device facing surface of the first bezel element surrounding the aperture is configured to absorb and/or block light emitted along the main direction from the diffuser device.

Advantageously, the second bezel element comprises an optical non-transparent body configured to absorb and/or block light emitted along the main direction from the diffuser device.

Advantageously, the first bezel element is configured as a frame element comprising the aperture, wherein the frame element essentially surrounds the optical element and the second bezel element. Preferably, the optical element and/or the second bezel element are mounted to the frame element via fastening means.

Advantageously, the second bezel element and the optical element are mounted to the first bezel element in such a way, that the second bezel element and the optical element protrude through the aperture and are held securely within a predetermined position within the aperture.

Advantageously, the optical element comprises light scattering and/or light diffusion elements, arranged on the light receiving surface and/or the light emitting surface thereof, wherein the light scattering and/or light diffusion elements are configured to scatter and/or diffuse light received from the diffuser device upon travelling through the optical element, such that diffused light is emitted from the optical element. This has the advantage of providing a homogenous light emission by the optical element.

Advantageously, the light emitting surface comprises a main surface and at least two, preferably three or more, side surfaces, wherein the main surface is oriented essentially orthogonal to the main direction and lies further from the light source along the main direction than the side surfaces, wherein the side surfaces extend from the main surface towards the light source to form the light emitting surface.

Advantageously, the illumination device further comprises a second optical element, which is arranged between the light source and the diffuser device, said second optical element comprises a lateral surface, which is configured to diffusely scatter and/or reflect light, emitted from the light source, impinging thereon.

Advantageously, the second optical element comprises a hollow body element with the lateral surface limiting the hollow body element and extending between the light source and the diffuser device in such a way, that a longitudinal axis of the hollow body element is essentially parallel to the main direction, wherein light emitted from the light source towards the diffuser device traverses thought the hollow body structure, within a volume limited by the lateral surface of the hollow body structure, and wherein, preferably the inner portion of, the lateral surface is configured to diffusely scatter and/or reflect light, emitted from the light source, impinging thereon.

Advantageously, the diffuser device and the second bezel element are built as one single piece, preferably via a 2-component injection moulding process, wherein the diffuser device and the second bezel element are configured in such a way, that the second bezel element extends away from the light exit surface of the diffuser device along the main direction.

According to another aspect of the invention, a headlight or tail light for a vehicle may be provided, comprising an illumination device according to the first aspect of the invention.

According to yet another aspect of the invention, a vehicle body part may be provided, comprising an illumination device according to the first aspect of the invention, wherein preferably the vehicle body part is configured to mounting a headlight or a tail light thereon, or the vehicle body part further comprises a headlight or a tail light. The vehicle body part could e.g. be a boot lid or a rear or front bumper.

BRIEF DESCRIPTION OF THE DRAWINGS

In the following, in order to further demonstrate the present invention, an illustrative and non-restrictive embodiment is discussed, as shown in the drawings, wherein.

DETAILED DESCRIPTION OF EMBODIMENTS OF THE INVENTION

Figure 1:
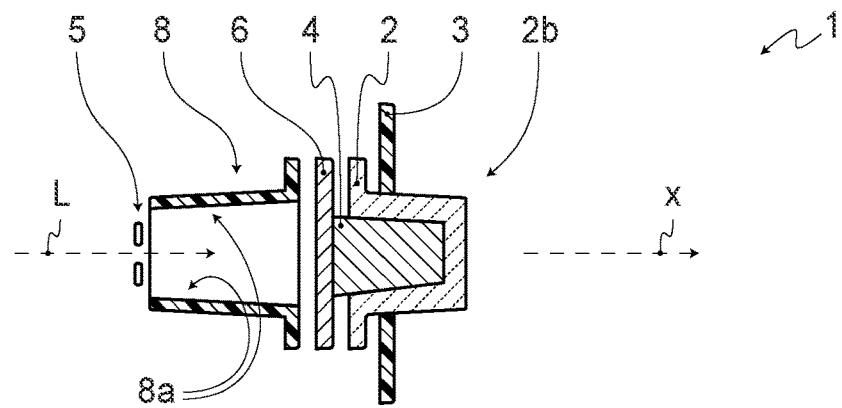
FIG. 1 shows a cross section of an illumination device according to an embodiment of the invention.
Figure 1A:
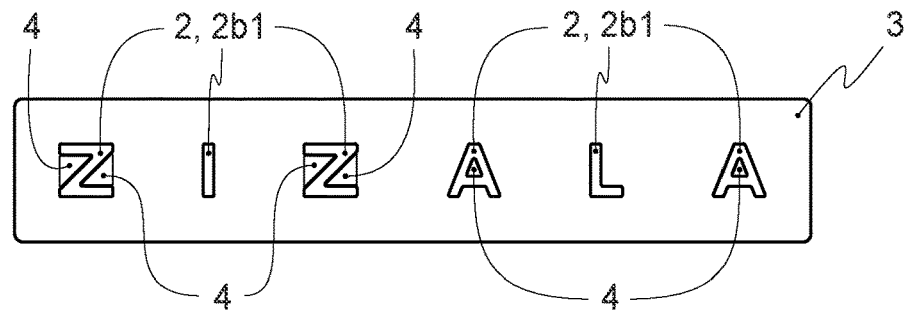
FIG. 1a shows a front view of the illumination device of FIG. 1.

FIG. 1 shows a cross section (along a vertical sectional plane) and FIG. 1a a front view of an illumination device 1 for a vehicle, wherein said illumination device 1 is configured to create an illuminated, in particular 3-dimensional, shape. In the shown embodiment, the illumination device 1 creates six illuminated shapes, in particular the letters Z, I, Z, A, L, A.

The illumination device 1 comprises an optical element 2, a first bezel element 3 and a second bezel element 4, wherein the illuminated shape is created by an optical interaction between the illuminated optical element 2, the first bezel element 3 and the second bezel element 4.

The illumination device 1 further comprises a light source 5 (in the shown embodiment, two light sources are indicated by oval shapes, arranged symmetrically around a main direction x), configured to emit light along the main direction x and a diffuser device 6 arranged downstream of the light source 5 along the main direction x.

Figure 2:
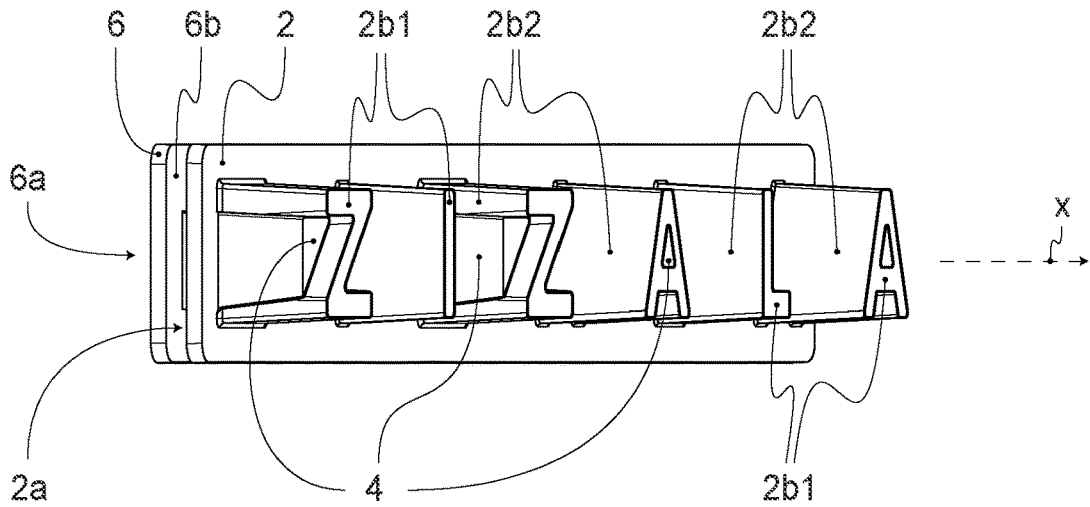
FIG. 2 shows the illumination device of FIG. 1 without a first bezel element.

As seen in FIG. 2, the diffuser device 6 is configured to receive light from the light source 5 (not shown in FIG. 2) via a light entry surface 6a of the diffuser device 6 and to emit the received light via a light exit surface 6b of the diffuser device 6. The diffuser device 6 is configured to scatter and/or diffuse light received from the light source 5 along the main direction x and to illuminate the optical element 2 with the scattered/diffused light.

The optical element 2 receives the scattered/diffused light from the optical diffuser 6 via a light receiving surface 2a of the optical element 2 (to become an illuminated optical element 2) and emits the received light along the main direction x via a light emitting surface 2b of the optical element 2. The light emitting surface 2b has a longitudinal extension along the main direction x. The light emitting surface 2b comprises a main surface 2b1 and a side surface 2b2 (in the shown embodiment, each letter has a main surface and side surfaces), wherein the main surface 2b1 is oriented essentially orthogonal to the main direction x and is disposed further from the light source 5 along the main direction x than the side surfaces 2b2. The side surfaces 2b2 extend from the main surface 2b1 towards the light source 5 to form the light emitting surface 2b.

As can be seen in FIG. 2, the optical element 2 comprises six light emitting surfaces 2b (each letter is represented by a light emitting surface 2b) connected to each other via a common base plate, which is oriented essentially parallel to the light exit surface 6b of the diffusor device 6. In the shown embodiment, each of the six light emitting surfaces 2b forms a different illuminated shape. The main surface 2b1 and the corresponding side surfaces 2b2 of each light emitting surface 2b form a specific letter. A person skilled in the art understands that various different shapes are possible.

The optical element 2, the first bezel element 3 and the second bezel element 4 are arranged downstream of the diffuser device 6 along the main direction x (see FIG. 1). The illuminated shape created with the illumination device 1 is composed of an illuminated, light emitting, area and a dark, non-light emitting, area. The illuminated area is created by the light emitting surface 2b of the illuminated optical element 2 and the dark area is created by the first bezel element 3 blocking/absorbing light emitted by the diffuser device 6 and the second bezel element 4 blocking/absorbing light emitted by the diffuser device 6 respectively.

Figure 3:
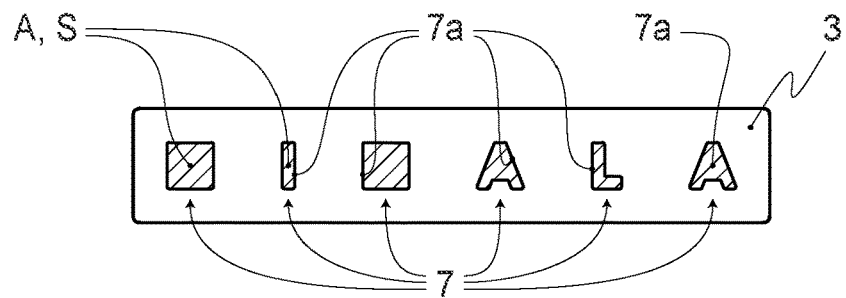
FIG. 3 shows a first bezel element of the illumination device of FIG. 1.

As shown in FIG. 3, the first bezel element 3 comprises an aperture 7, which has a shape defined and limited by a rim portion 7a of the first bezel element 3 and which lies in an aperture plane A. The aperture plane A is essentially orthogonal to the main direction x. The first bezel element 3 and the optical element 2 are arranged to each other in such a way, that the optical element 2 permeates said aperture 7 in a sectional plane S, which coincides within the aperture plane A, such that the light receiving surface 2a of the optical element 2 is arranged on a diffuser device 6 facing side of the first bezel element 3 and the light emitting surface 2b of the optical element 2 is arranged at least partially on a diffuser device 6 averted side of the first bezel element 3.

Figure 6:
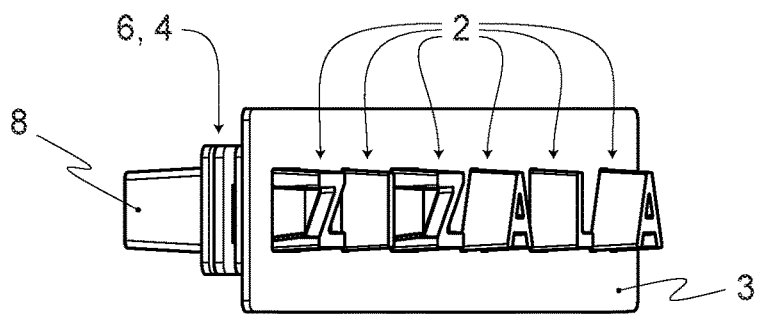
FIG. 6 shows an optical element and a first bezel element of the illumination device of FIG. 1.

The optical element 2 being inserted in the aperture 7 can be seen in FIG. 6. An intersection of an outer surface of the optical element 2 in the sectional plane S, corresponds to the shape of the aperture 7 in such a way, that when the optical element 2 permeates the aperture 7, the outer surface of the optical element 2 at least partially or fully contacts the rim portion 7a of the aperture 7. A diffuser device 6 facing surface of the first bezel element 3 surrounding the aperture 7 is configured to absorb and/or block light emitted along the main direction x from the diffuser device 6. The first bezel element 3 is essentially configured as a frame element comprising the aperture 7, wherein the frame element essentially surrounds the optical element 2 and the second bezel element 4.

The optical element 2 has an outer surface, which corresponds to the illuminated, light emitting, area of the illuminated shape. The second bezel element 4 has an outer surface, which corresponds to a first portion of the dark, non-light emitting, area of the illuminated shape, wherein the rim portion 7a of the first bezel element 3 corresponds to a second portion of the dark, non-light emitting, area of the illuminated shape. The first portion and the second portion together form the dark, non-light-emitting, area of the illuminated shape.

As seen in FIG. 1 (and in detail in FIGS. 5 and 6), the second bezel element 4 has a longitudinal extension along the main direction x. The first bezel element 3 and the second bezel element 4 are arranged to each other in such a way, that second bezel element 4 permeates the aperture in the sectional plane S. The second bezel element 4 and the optical element 2 are mounted to the first bezel element 3 in such a way, that the second bezel element 4 and the optical element 2 protrude through the aperture 7 and are held securely within a predetermined position within the aperture 7.

As shown in FIGS. 1 and 2, on the diffuser device 6 averted side of the first bezel element 3 the longitudinal extension of the second bezel element 4 is shorter than the longitudinal extension of the optical element 2.

In the sectional plane S, defined as the plane in which the optical element 2 and the second bezel element 4 intersect the aperture plane A, the intersection of the optical element 2 with the aperture plane A defines a first shape, the intersection of the second bezel element 4 with the aperture plane A defines a second shape, and the rim portion 7a of the first bezel element 3 defines a third shape within the aperture plane A. The first shape, the second shape and the third shape together depict a 2-dimensional projection of the illuminated shape.

The shape of the optical element 2 and the shape of the aperture 7 are formed dependent on each other in such a way, that movement of the optical element 2 relative to the first bezel element 3, in a state when the optical element 2 is inserted in the aperture 7, is limited to a direction along the main direction x.

Figure 4:
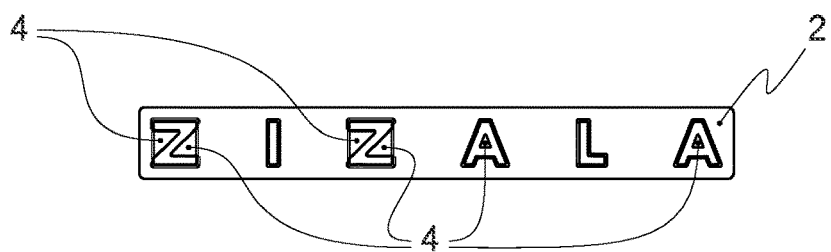
FIG. 4 shows an optical element and a second bezel element of the illumination device of FIG. 1.

FIG. 4 shows a view of the isolated optical element 2 with the second bezel element 4, wherein when the part shown in FIG. 4 is mounted to the first bezel element 3 shown in FIG. 3, such that the optical element 2 and the second bezel element 4 protrudes the apertures 7, illuminated shapes can be created by illuminating the optical element 2 as described above.

Figure 5:
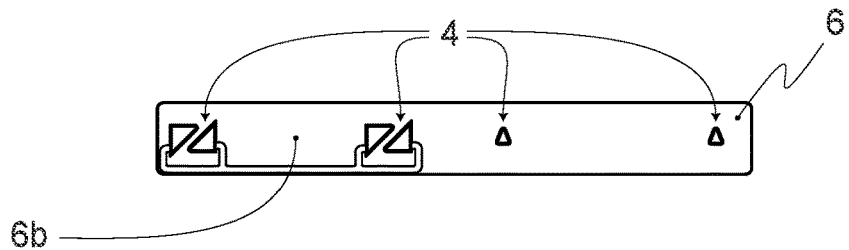
FIG. 5 shows a second bezel element and a diffuser device of the illumination device of FIG. 1.

FIG. 5 shows a view of the isolated second bezel element 4 without the other components. As seen in FIG. 5, the diffuser device 6 and the second bezel element 4 are built as one single piece, preferably via a 2-component injection moulding process. The diffuser device 6 and the second bezel element 4 are configured in such a way, that the second bezel element 4 extends away from the light exit surface 6b of the diffuser device 6 along the main direction x. The diffuser device 6 and the second bezel element 4 can also be two separated parts.

The optical element 2 is an optical transparent body with a longitudinal extension along the main direction x and the second bezel element 4 comprises an optical non-transparent body with a longitudinal extension along the main direction x. The second bezel element 4 comprises an optical non-transparent body configured to absorb and/or block light emitted along the main direction x from the diffuser device 6.

The optical element 2 preferably comprises light scattering and/or light diffusion elements, arranged on the light receiving surface 2a and/or the light emitting surface 2b thereof. The light scattering and/or light diffusion elements are configured to scatter and/or diffuse light received from the diffuser device 6 upon travelling through the optical element 2, such that diffused light is emitted from the optical element 2.

The illumination device 1 can further comprise an optional second optical element 8 (see FIG. 1 and FIG. 6), which is arranged between the light source 5 and the diffuser device 6. The second optical element 8 comprises a lateral surface 8a, which is configured to diffusely scatter and/or reflect light, emitted from the light source 5, impinging thereon. The second optical element 8 comprises a hollow body element with the lateral surface 8a limiting the hollow body element and extending between the light source 5 and the diffuser device 6 in such a way, that a longitudinal axis L of the hollow body element is essentially parallel to the main direction x. Light emitted from the light source 5 towards the diffuser device 6 traverses thought the hollow body structure, within a volume (i.e. a cavity or a hollow space) limited by the lateral surface 8a of the hollow body structure. Preferably the inner portion of the lateral surface 8a is configured to diffusely scatter and/or reflect light, emitted from the light source 5, impinging thereon.

LIST OF REFERENCE SIGNS 1 illumination device
2 optical element
2a light receiving surface of the optical element
2b light emitting surface of the optical element
2b1 main surface
2b2 side surface
3 first bezel element
4 second bezel element
5 light source
6 diffuser device
6a light entry surface of the diffuser device
6b light exit surface of the diffuser device
7 aperture
7a rim portion
8 optical element
8a lateral surface That which is claimed is:

1. An illumination device (1) for a vehicle, wherein said illumination device (1) is configured to create an illuminated, in particular 3-dimensional, shape, wherein the illumination device (1) comprises an optical element (2), a first bezel element (3) and a second bezel element (4), wherein the illuminated shape is created by an optical interaction between the optical element (2), the first bezel element (3) and the second bezel element (4), wherein the illumination device (1) further comprises:

a light source (5) configured to emit light along a main direction (x); and a diffuser device (6) arranged downstream of the light source (5) along the main direction (x) and configured to receive light from the light source (5) via a light entry surface (6a) of the diffuser device (6) and to emit the received light via a light exit surface (6b) of the diffuser device (6), wherein the diffuser device (6) is configured to scatter and/or diffuse light received from the light source (5) along the main direction (x) and to illuminate the optical element (2) with the scattered/diffused light, wherein the optical element (2) is configured to receive the scattered/diffused light from the diffuser device (6) via a light receiving surface (2a) of the optical element (2) and emit the received light along the main direction (x) via a light emitting surface (2b) of the optical element (2), wherein said light emitting surface (2b) has a longitudinal extension along the main direction (x), wherein the optical element (2), the first bezel element (3) and the second bezel element (4) are arranged downstream of the diffuser device (6) along the main direction (x), wherein the illuminated shape created with the illumination device (1) is composed of an illuminated, light emitting, area and a dark, non-light emitting, area, wherein the illuminated area is created by the light emitting surface of the illuminated optical element (2) and the dark area is created by the first bezel element (3) blocking/absorbing light emitted by the diffuser device (6) and the second bezel element (4) blocking/absorbing light emitted by the diffuser device (6) respectively, wherein the first bezel element (3) comprises an aperture (7), which has a shape defined and limited by a rim portion (7a) of the first bezel element (3) and which lies in an aperture plane (A), wherein the first bezel element (3) and the optical element (2) are arranged to each other in such a way, that the optical element (2) permeates said aperture (7) in a sectional plane (S), which coincides within the aperture plane (A), such that the light receiving surface (2a) of the optical element (2) is arranged on a diffuser device (6) facing side of the first bezel element (3) and the light emitting surface (2b) of the optical element (2) is arranged at least partially on a diffuser device (6) averted side of the first bezel element (3), wherein the second bezel element (4) has a longitudinal extension along the main direction (x), wherein the first bezel element (3) and the second bezel element (4) are arranged to each other in such a way, that second bezel element (4) permeates the aperture in the sectional plane (S), and wherein an intersection of an outer surface of the optical element (2) in the sectional plane (S), corresponds to the shape of the aperture (7) in such a way, that when the optical element (2) permeates the aperture (7), the outer surface of the optical element (2) at least partially or fully contacts the rim portion (7a).

2. The illumination device (1) according to claim 1, wherein on the diffuser device (6) averted side of the first bezel element (3) the longitudinal extension of the second bezel element (4) is shorter than the longitudinal extension of the optical element (2).

3. The illumination device (1) according to claim 1, wherein in the sectional plane (S), defined as the plane in which the optical element (2) and the second bezel element (4) intersect the aperture plane (A), the intersection of the optical element (2) with the aperture plane (A) defines a first shape, the intersection of the second bezel element (4) with the aperture plane (A) defines a second shape, and the rim portion (7a) of the first bezel element (3) defines a third shape within the aperture plane (A), wherein the first shape, the second shape and the third shape together depict a 2-dimensional projection of the illuminated shape.

4. The illumination device (1) according to claim 1, wherein the optical element (2) has an outer surface, which corresponds to the illuminated, light emitting, area of the illuminated shape, wherein the second bezel element (4) has an outer surface, which corresponds to a first portion of the dark, non-light emitting, area of the illuminated shape, wherein the rim portion (7a) of the first bezel element (3) corresponds to a second portion of the dark, non-light emitting, area of the illuminated shape, wherein the first portion and the second portion form the dark, non-light-emitting, area of the illuminated shape.

5. The illumination device (1) according to claim 1, wherein the shape of the optical element (2) and the shape of the aperture (7) are formed dependent on each other in such a way, that movement of the optical element (2) relative to the first bezel element (3), in a state when the optical element (2) is inserted in the aperture (7), is limited to a direction along the main direction (x).

6. The illumination device (1) according to claim 1, wherein the optical element (2) is an optical transparent body with a longitudinal extension along the main direction (x), wherein the second bezel element (4) comprises an optical non-transparent body with a longitudinal extension along the main direction (x).

7. The illumination device (1) according to claim 1, wherein a diffuser device (6) facing surface of the first bezel element (3) surrounding the aperture (7) is configured to absorb and/or block light emitted along the main direction (x) from the diffuser device (6).

8. The illumination device (1) according to claim 1, wherein the first bezel element (3) is configured as a frame element comprising the aperture (7), wherein the frame element essentially surrounds the optical element (2) and the second bezel element (4).

9. The illumination device (1) according to claim 1, wherein the second bezel element (4) and the optical element (2) are mounted to the first bezel element (3) in such a way, that the second bezel element (4) and the optical element (2) protrude through the aperture (7) and are held securely within a predetermined position within the aperture (7).

10. The illumination device (1) according to claim 1, wherein the optical element (2) comprises light scattering and/or light diffusion elements, arranged on the light receiving surface (2a) and/or the light emitting surface (2b) thereof, wherein the light scattering and/or light diffusion elements are configured to scatter and/or diffuse light received from the diffuser device (6) upon travelling through the optical element (2), such that diffused light is emitted from the optical element (2).

11. The illumination device (1) according to claim 1, wherein the light emitting surface (2b) comprises a main surface (2b1) and at least two side surfaces (2b2), wherein the main surface (2b1) is oriented essentially orthogonal to the main direction (x) and lies further from the light source (5) along the main direction (x) than the side surfaces (2b2), wherein the side surfaces (2b2) extend from the main surface (2b1) towards the light source (5) to form the light emitting surface (2b).

12. The illumination device (1) according to claim 1, wherein the illumination device (1) further comprises a second optical element (8), which is arranged between the light source (5) and the diffuser device (6), said second optical element (8) comprises a lateral surface (8a), which is configured to diffusely scatter and/or reflect light, emitted from the light source (5), impinging thereon.

13. A vehicle body part, comprising an illumination device (1) according to claim 1.

14. The illumination device (1) according to claim 6, wherein the optical non-transparent body is configured to absorb and/or block light emitted along the main direction (x) from the diffuser device (6).

15. The illumination device (1) according to claim 11, wherein the light emitting surface (2b) comprises three or more side surfaces (2b2).

16. The illumination device (1) according to claim 12, wherein the second optical element (8) comprises a hollow body element with the lateral surface (8a) limiting the hollow body element and extending between the light source (5) and the diffuser device (6) in such a way, that a longitudinal axis (L) of the hollow body element is essentially parallel to the main direction (x), wherein light emitted from the light source (5) towards the diffuser device (6) traverses thought the hollow body structure, within a volume limited by the lateral surface (8a) of the hollow body structure.

17. The illumination device (1) according to claim 16, wherein the inner portion of the lateral surface (8a) is configured to diffusely scatter and/or reflect light, emitted from the light source (5), impinging thereon.

18. The vehicle body part according to claim 13, which is configured to mount a headlight or a tail light thereon, or which further comprises a headlight or a tail light.

19. An illumination device (1) for a vehicle, wherein said illumination device (1) is configured to create an illuminated, in particular 3-dimensional, shape, wherein the illumination device (1) comprises an optical element (2), a first bezel element (3) and a second bezel element (4), wherein the illuminated shape is created by an optical interaction between the optical element (2), the first bezel element (3) and the second bezel element (4), wherein the illumination device (1) further comprises:
- a light source (5) configured to emit light along a main direction (x); and
- a diffuser device (6) arranged downstream of the light source (5) along the main direction (x) and configured to receive light from the light source (5) via a light entry surface (6a) of the diffuser device (6) and to emit the received light via a light exit surface (6b) of the diffuser device (6), wherein the diffuser device (6) is configured to scatter and/or diffuse light received from the light source (5) along the main direction (x) and to illuminate the optical element (2) with the scattered/diffused light, wherein the optical element (2) is configured to receive the scattered/diffused light from the diffuser device (6) via a light receiving surface (2a) of the optical element (2) and emit the received light along the main direction (x) via a light emitting surface (2b) of the optical element (2), wherein said light emitting surface (2b) has a longitudinal extension along the main direction (x), wherein the optical element (2), the first bezel element (3) and the second bezel element (4) are arranged downstream of the diffuser device (6) along the main direction (x), wherein the illuminated shape created with the illumination device (1) is composed of an illuminated, light emitting, area and a dark, non-light emitting, area, wherein the illuminated area is created by the light emitting surface of the illuminated optical element (2) and the dark area is created by the first bezel element (3) blocking/absorbing light emitted by the diffuser device (6) and the second bezel element (4) blocking/absorbing light emitted by the diffuser device (6) respectively, wherein the first bezel element (3) comprises an aperture (7), which has a shape defined and limited by a rim portion (7a) of the first bezel element (3) and which lies in an aperture plane (A), wherein the first bezel element (3) and the optical element (2) are arranged to each other in such a way, that the optical element (2) permeates said aperture (7) in a sectional plane (S), which coincides within the aperture plane (A), such that the light receiving surface (2a) of the optical element (2) is arranged on a diffuser device (6) facing side of the first bezel element (3) and the light emitting surface (2b) of the optical element (2) is arranged at least partially on a diffuser device (6) averted side of the first bezel element (3), wherein the diffuser device (6) and the second bezel element (4) are built as one single piece, wherein the diffuser device (6) and the second bezel element (4) are configured in such a way, that the second bezel element (4) extends away from the light exit surface (6b) of the diffuser device (6) along the main direction (x).

20. The illumination device according to claim 19, wherein the diffuser device (6) and the second bezel element (4) are built as one single piece via a 2-component injection moulding process.

* * * * *